United States Patent
Satapathy

(10) Patent No.: US 7,072,641 B2
(45) Date of Patent: Jul. 4, 2006

(54) REACTIVE MANAGEMENT OF DROPPED CALLS IN A WIRELESS COMMUNICATION SYSTEM

(75) Inventor: Durga Prasad Satapathy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 549 days.

(21) Appl. No.: 10/101,002

(22) Filed: Mar. 19, 2002

(65) Prior Publication Data

US 2004/0203607 A1 Oct. 14, 2004

(51) Int. Cl.
*H04M 1/65* (2006.01)
*H04Q 7/20* (2006.01)

(52) U.S. Cl. ............................... 455/412.1; 455/226.2; 455/413; 455/437; 455/455; 455/456.5; 455/510

(58) Field of Classification Search ............. 455/456.1, 455/413, 412, 38, 414, 423
See application file for complete search history.

(56) References Cited

U.S. PATENT DOCUMENTS

| | | | |
|---|---|---|---|
| 4,495,647 A * | 1/1985 | Burke et al. ................. 340/7.57 |
| 5,333,175 A | 7/1994 | Ariyavisitakul et al. |
| 5,657,026 A | 8/1997 | Culpepper et al. |
| 5,701,294 A | 12/1997 | Ward et al. |
| 5,995,830 A * | 11/1999 | Amin et al. ................. 455/423 |
| 6,032,040 A * | 2/2000 | Choy et al. ............... 455/414.1 |
| 6,192,240 B1 * | 2/2001 | Tayloe et al. ................. 455/428 |
| 6,275,690 B1 * | 8/2001 | Higuchi et al. ........... 455/412.2 |
| 6,278,881 B1 | 8/2001 | Balck |
| 6,298,233 B1 | 10/2001 | Souissi et al. |
| 6,343,216 B1 | 1/2002 | Kim et al. |
| 6,370,382 B1 * | 4/2002 | Kang et al. .................. 455/445 |
| 6,381,455 B1 | 4/2002 | Smolik |
| 6,389,285 B1 | 5/2002 | Escamilla et al. |
| 6,445,918 B1 * | 9/2002 | Hellander .................... 455/423 |
| 6,597,906 B1 | 7/2003 | Van Leeuwen et al. |
| 6,667,962 B1 * | 12/2003 | Lee et al. .................... 370/335 |
| 6,721,572 B1 * | 4/2004 | Smith et al. ............. 455/456.1 |
| 6,950,648 B1 * | 9/2005 | Pappalardo et al. ...... 455/412.1 |
| 2001/0041590 A1 * | 11/2001 | Siberfenig et al. .......... 455/556 |
| 2002/0009992 A1 | 1/2002 | Jensen ........................ 455/422 |
| 2002/0115429 A1 * | 8/2002 | Deluca et al. .............. 455/413 |
| 2002/0160751 A1 * | 10/2002 | Sun et al. .................... 455/412 |
| 2003/0054802 A1 * | 3/2003 | Xie .............................. 455/412 |

(Continued)

FOREIGN PATENT DOCUMENTS

WO    WO 9723963 A2 * 7/1997

OTHER PUBLICATIONS

The Official Sharper Image Site—Car Cell Phone System with Continuous Digital Recording Hear It Again™ Technology, http://www.sharperimage.com/us/en/catalog/productview.jhtml?pid=4&catid=28256600&pcatid=401, printed from the World Wide Web on Feb. 6, 2002.

(Continued)

*Primary Examiner*—Fan Tsang
*Assistant Examiner*—Lisa Hashem

(57) ABSTRACT

A method and system is disclosed for reactively managing dropped calls in a wireless communication system. A mobile station determines that it has experienced a dropped call. In response, the mobile station allows a user to continue communicating, such as by recording the user's speech, for instance. The mobile station may then play out the recorded speech to the user or to another call participant, such as upon reestablishment of the call.

21 Claims, 9 Drawing Sheets

U.S. PATENT DOCUMENTS

2003/0134617 A1* 7/2003 Duerk et al. ................. 455/412
2004/0203645 A1* 10/2004 Forman et al. ........... 455/414.1
2005/0153729 A1* 7/2005 Logan et al. ............. 455/550.1
2006/0019650 A1* 1/2006 Kedem .................... 455/422.1

OTHER PUBLICATIONS

Car Cell Phone System with Continuous Digital Recorder Hear it Again™ Technology, Skymall, p. 15, early Spring 2002.

* cited by examiner

REACTIVE MANAGEMENT OF DROPPED CALLS IN A WIRELESS COMMUNICATION SYSTEM

BACKGROUND OF THE INVENTION

1. Field of the Invention

The present invention relates to wireless communications and, more particularly, to management of dropped calls in a wireless communication system.

2. Description of Related Art

Cellular wireless, like other forms of wireless communication, is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

In a typical cellular wireless system, an area is divided geographically into a number of cell sites, each defined by a radio frequency ("RF") radiation pattern from a respective base transceiver station ("BTS") antenna. Each BTS antenna in a cell is in turn coupled with a base station controller ("BSC"), cooperatively defining a base station system. And the BSC is then coupled to or functionally integrated within a switch (e.g., a mobile switching center ("MSC")) and/or gateway (e.g., a packet data serving node ("PDSN")) that provides connectivity with a transport network such as the PSTN (public switched telephone network) or a public or private IP network (e.g., the Internet).

When a mobile station, such as a cellular telephone, pager, or appropriately equipped portable computer, for instance, is positioned in a cell, the mobile station communicates via an RF air interface with the BTS antenna of the cell. Consequently, a communication can be established between the mobile station and another entity on the transport network, via the air interface, the BTS, the BSC and the switch or gateway. Such a communication may be referred to as a "call," whether the communication is a traditional voice "call" or a more advanced data session.

Communications between the mobile station and the BTS will typically suffer from varying levels of interference and signal degradation, due to factors such as (i) the number and power level of mobile stations concurrently communicating over the air interface, (ii) obstructions such as buildings, land or foliage, and (iii) the distance between the mobile station and the BTS. Consequently, the strength of RF signals that the mobile station receives from the BTS can vary. And the strength of RF signals that the BTS receives from the mobile station can vary.

When a mobile station is actively engaged in a call, if the RF signal strength received by the mobile station and/or BTS becomes too low, the RF link will be effectively cut off, which will thereby disconnect or "drop" the call.

SUMMARY

An exemplary embodiment of the invention may include proactive and/or reactive mechanisms for dropped-call management. The proactive mechanism provides for determining that a call is likely to be dropped and for then responsively alerting a call participant before the call is dropped. And the reactive mechanism provides for determining that a call has been dropped and for then responsively enabling a participant to continue communicating.

These and other aspects will be understood by those of ordinary skill in the art by reading the following detailed description with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

A. Exemplary Communication System

Figure 1:
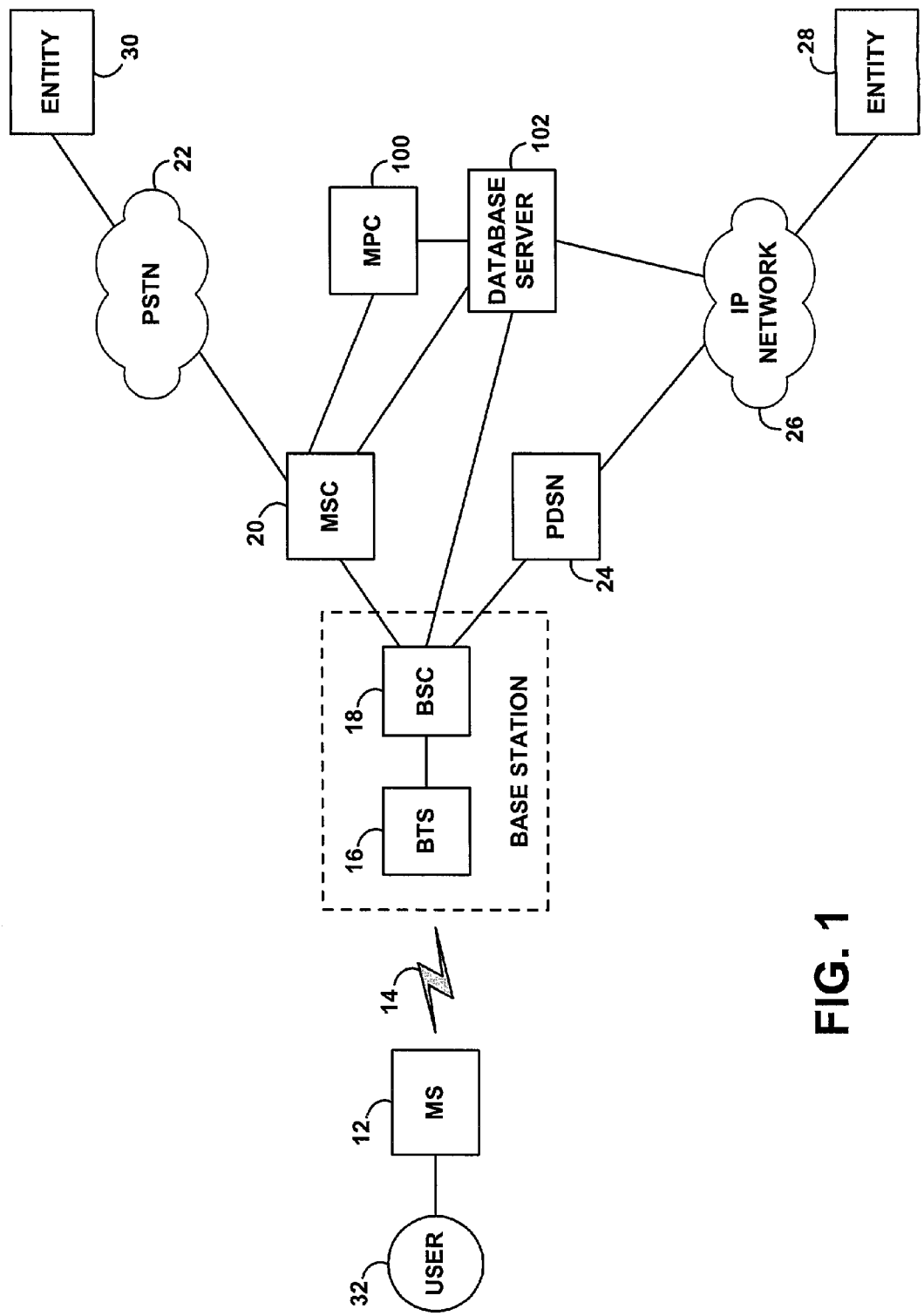
FIG. 1 is a block diagram of a communication system in which the exemplary embodiment can be implemented.

Referring to the drawings, FIG. 1 is a block diagram of a communication system in which an exemplary embodiment of the present invention can be implemented. Note that this and other arrangements described herein are illustrative only, and other arrangements and other elements (e.g., machines, interfaces, functions, orders of functions, etc.) can be used instead and some elements may be omitted altogether. In this regard, it should be understood that various entities shown in the figures are functional in nature and, as such, may be physically embodied in a variety of forms and may be embodied in or implemented as discrete components or in conjunction with other components (whether or not shown), in any suitable combination and location.

In the exemplary system shown in FIG. 1, a mobile station (MS) 12 communicates via an RF air interface 14 with a BTS 16, which is then coupled with a BSC 18. As noted above, the BSC may then be coupled or integrated with a switch or gateway that provides connectivity with a transport network. For example, as shown, BSC 18 may be coupled with an MSC 20, which provides connectivity with PSTN 22. (In this regard, the BSC function can be integrated into the MSC, thereby eliminating the BSC as a discrete network element.) And as another example, BSC 18 may be coupled with a PDSN 24, which provides connectivity with an IP network 26 such as the Internet.

Through this arrangement, MS 12 can engage in a call with an entity on a transport network. For example, if suitably equipped, MS 12 may engage in a data session with an entity 28 on IP network 26. And as another example, if suitably equipped, MS 12 may engage in a voice call with an entity 30 on PSTN 24. Of course, MS 12 might also or instead engage in other types of calls with other types of entities, through various communication paths.

When MS 12 is actively engaged in a call with another entity on a transport network, a user 32 of MS 12 may be able to interact with that other entity. For example, if the other entity is a telephone, the user may be able to engage in a call with another person (call-participant) operating that telephone. And as another example, if the other entity is a web server, the user may be able to engage in a data session with that web server, such as by operating a web browser on the mobile station 12. Additional examples are possible as well.

The exemplary system of FIG. 1 may also include a mobile-positioning system, which can function to determine the location of mobile stations. As shown in FIG. 1, for instance, a mobile positioning center (MPC) 100 can be linked with MSC 20 via a signaling network. According to well known industry standards (e.g., J-STD-036), the MPC 100 may be an application running on a service control point (SCP) platform and functions as a location server, able to maintain records of mobile station location and to report location information to querying entities. The MPC may determine the location of a mobile station through interaction with position determining equipment (not shown), which may be network-based (e.g., triangularization mechanisms) or handset-based (e.g., GPS-determined location reported from a mobile station).

In the arrangement shown, MPC may also be coupled with a database server 102 (which could instead be generalized as a database function, whether discrete or integrated as part of the MPC or some other entity). Database server 102 may function to extract location information from MPC 100. Further, as shown, database server 102 may be coupled with MSC 20 so as to be able to obtain call drop information (e.g., records of call drop events) from MSC 20. And database server 102 may be coupled with BSC 18 so as to be able to interact with BSC 18, and with IP network 26 so as to be able to interact with other entities via IP network 26. Other arrangements are possible as well.

Figure 2:
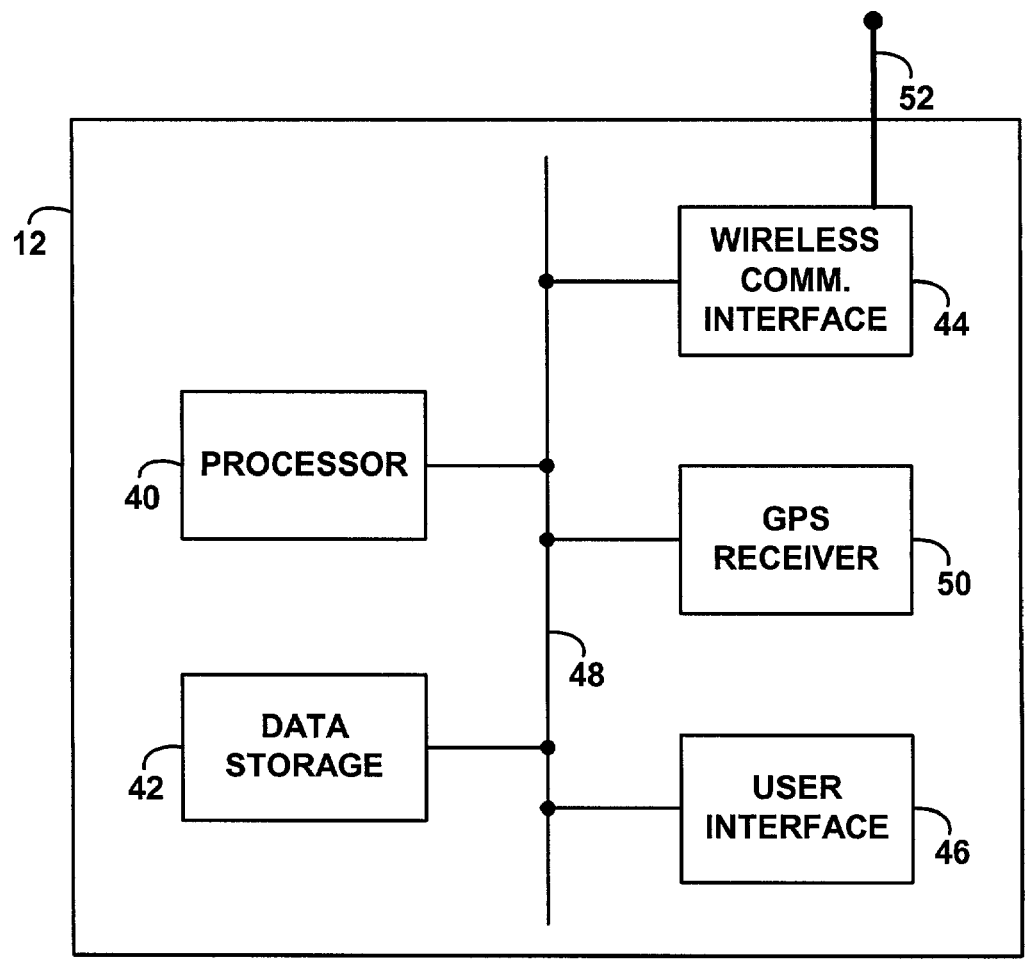
FIG. 2 is a block diagram of an exemplary mobile station as depicted in FIG. 1.

Referring next to FIG. 2, a simplified block diagram of an exemplary MS 12 is shown. As illustrated, MS 12 may include a processor 40, data storage 42, a wireless communication interface 44 and a user interface 46, all coupled together by a system bus 48. In addition, MS 12 may include a global positioning system (GPS) receiver 50, to facilitate determining its location.

In the exemplary embodiment, data storage 42 may hold a set of machine language instructions, which are executable by processor 40 to carry out various function described herein. (Note that, alternatively, some of those functions could instead be implemented through hardware.) In addition, data storage 42 may hold various data to facilitate carrying out various functions. For example, data storage 42 may hold speech signals, and data storage 42 may hold threshold data and user interface data.

Wireless communication interface 44 in turn functions to facilitate communication over air interface 14. Thus wireless communication interface 44 may include a suitable antenna 52 and transceiver circuitry (not shown). And user interface 46 functions to facilitate interaction with a user of the mobile station. As such, user interface 46 may include input mechanisms (e.g., a microphone, video camera and/or keypad) and output mechanisms (e.g., audio speaker and/or video display) (not shown).

Figure 3:
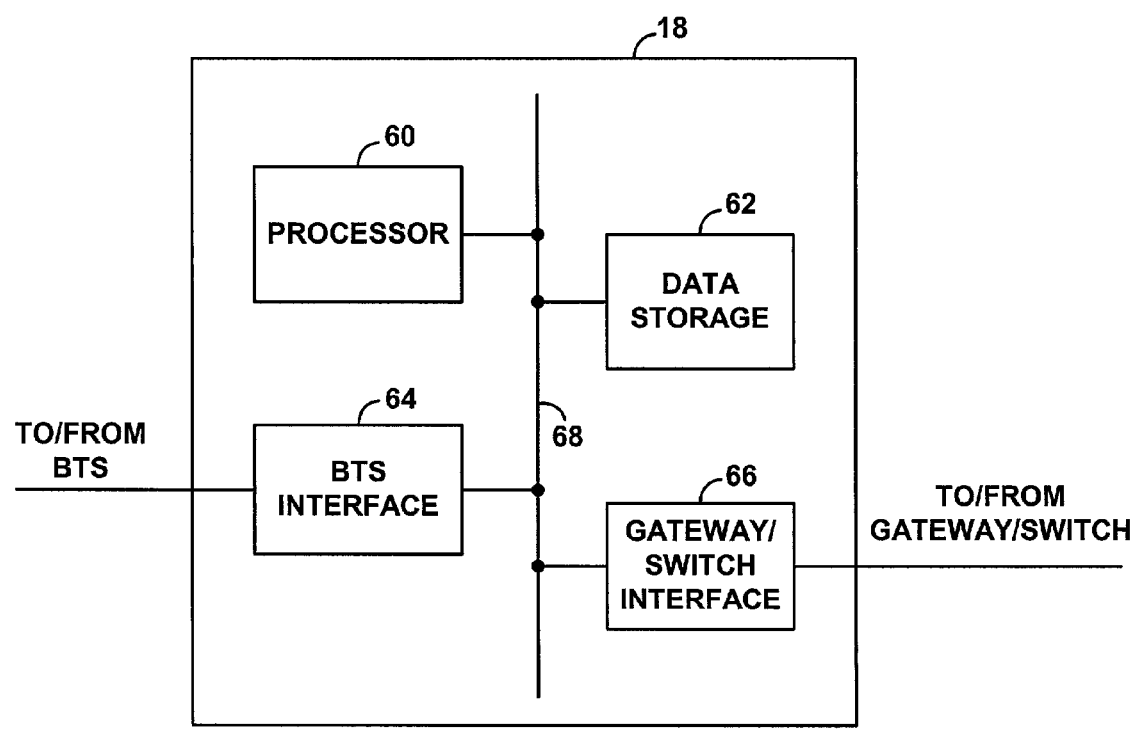
FIG. 3 is a block diagram of an exemplary base station as depicted in FIG. 1.

Referring next to FIG. 3, a simplified block diagram of BSC 18 is shown as well. As illustrated, BSC 18 includes a processor 60, data storage 62, a BTS interface 64, and a gateway/switch interface 66, all interconnected by a system bus 68. In the exemplary embodiment, data storage 62 may hold machine language instructions that are executable by processor 60 to carry out various functions described herein. (Note that, alternatively, some of those functions could instead be implemented through hardware.) And data storage 62 may also hold data to facilitate carrying out various functions described. BTS interface 64 facilitates communication with BTS 16, and gateway/switch interface 66 facilitates communication with a gateway and/or switch, such as MSC 20 and/or PDSN 24.

B. Management of Dropped Calls

As noted above, a call in which a mobile station is engaged can be dropped. Usually, a call-drop event occurs because the strength of RF signals received by the mobile station and/or by the base station becomes too low, and the RF link is lost. However, other circumstances may cause a call-drop event as well. Further, a call drop event should be distinguished from a normal cessation of a call, where the mobile station and/or base station sends to the other an end-of-call signal of some sort.

As further indicated above, the exemplary embodiment provides both proactive and reactive mechanisms for managing dropped calls. The proactive mechanism provides for determining that a call is likely to be dropped and for then responsively alerting a call participant before the call is dropped. And the reactive mechanism provides for determining that a call has been dropped and for then responsively enabling a participant to continue communicating. The following sections will discuss these mechanisms respectively. Note that these two mechanisms can be combined together as well to provide more comprehensive call drop management.

C. Proactive Management of Dropped Calls

Figure 4:
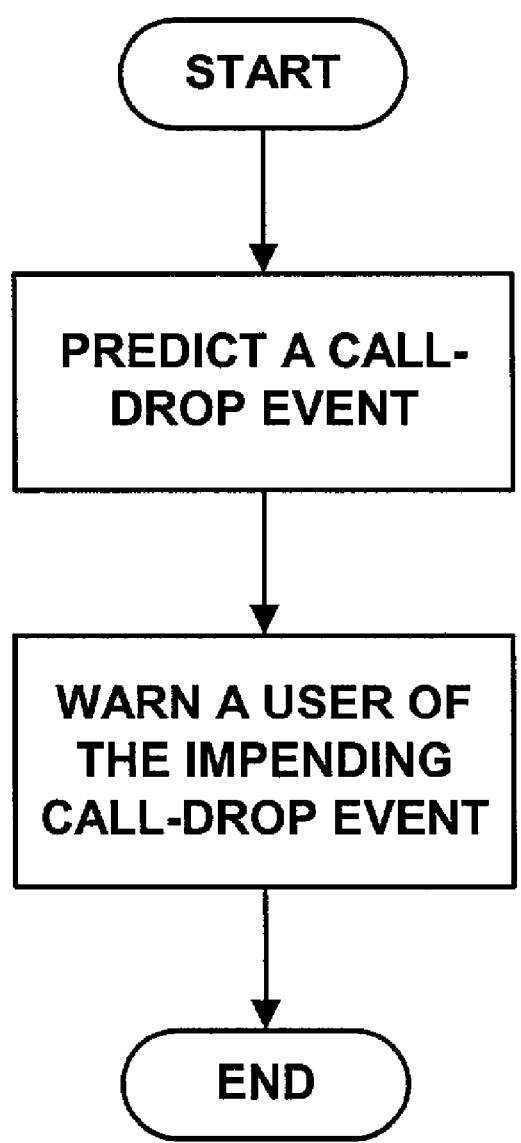
FIG. 4 is a flow chart depicting functions employed in an exemplary proactive call drop management system.

Pursuant to one aspect of the exemplary embodiment, a prediction may be made that a call with a mobile station is about to be dropped, and a participant in the call can be warned of the imminent call-drop. This proactive mechanism is generally illustrated by a flow chart in FIG. 4. And the following sections will now expand on these functions.

1. Predicting a Dropped Call

The function of predicting that a call is about to be dropped can take various forms. Further, the function can be carried out by various entities such as the BSC, the MS and/or another suitable entity.

Note that the accuracy of the prediction, while probably important from an implementation perspective, is not necessarily critical to a definition of the exemplary embodiment. That is, the exemplary embodiment contemplates that a prediction will be made, not necessarily that the prediction will be correct in all cases.

a. Predicting by Comparison of Received Signal Strength

By way of example, the function of predicting that a call is about to be dropped may take into consideration the RF signal strength received by the MS and/or by the BTS. If the received signal strength falls below a defined threshold and/or continuously decreases to below a defined threshold, then it may be reasonable to conclude that the call is about to be dropped.

Figure 5:
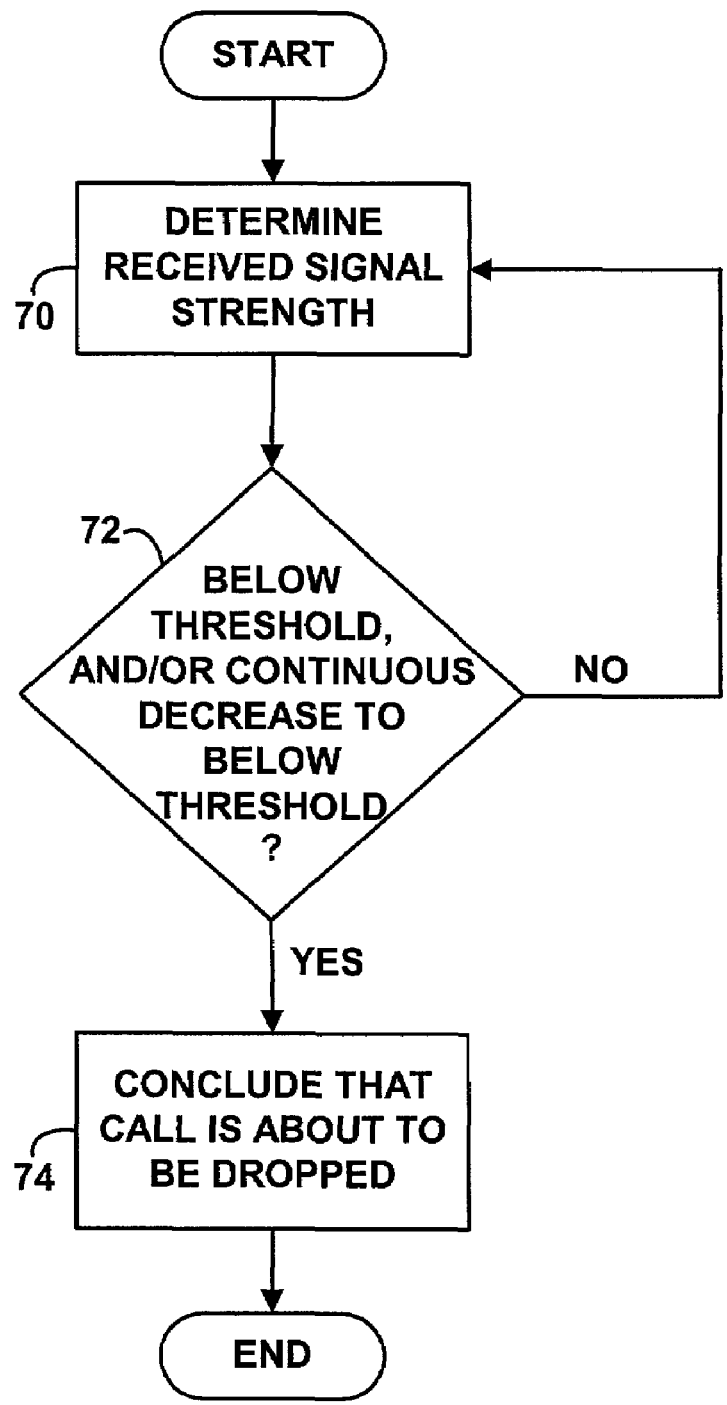
FIG. 5 is a flow chart depicting consideration of receive signal strength to determine that a call is about to be dropped, in accordance with an exemplary proactive call drop management system.

FIG. 5 generally illustrates this process during a call. Referring to FIG. 5, at block 70, received signal strength is regularly determined. At block 72, a determination is then made as to whether the received signal strength falls below a defined threshold and/or continuously decreases to below a defined threshold. And if so, then, at block 74, a conclusion is made that the call is about to be dropped.

The BSC may conduct the analysis, for instance, by regularly comparing to a threshold "warning-level" the strength of an RF signal that the BTS receives from the mobile station. In this regard, well known industry standard power-control procedures already provide a mechanism for a BSC to monitor BTS received signal strength. Applying these standards, the BSC can thus determine the BTS received signal strength. And, according to the exemplary embodiment, the BSC can then simply compare that received signal strength to the threshold warning-level in order to determine whether the received signal strength falls below the threshold. If the BTS received signal strength falls below the threshold, then the BSC can conclude that a dropped call is about to occur.

Alternatively, the BSC may conduct this analysis by regularly comparing to a warning-level the strength of an RF signal that the MS receives from the BTS. (Note that this warning-level might be different than the warning-level that would be used as a threshold for BTS received signal strength.) Well known industry standards also provide a mechanism for a BSC to learn MS received signal strength. In particular, the BSC can send a control signal to the MS, requesting a read on MS received signal strength. And the MS can respond by sending to the BSC an indication of MS received signal strength. (Under IS-2000a, for instance, this response signal may be a "Pilot Strength Measurement Message" ("PSMM"), which defines the strength of a BTS "pilot signal" as received by the MS). According to the exemplary embodiment, the BSC may then compare the MS received signal strength to the warning-level, to determine whether the received signal strength falls below the warning-level. And if it does, the BSC may then conclude that a dropped call is about to occur.

Still alternatively, the MS may conduct this analysis, for instance, by regularly comparing to a warning-level the MS received signal strength. Again, under well known industry standards, the MS is already able to measure its received signal strength. According to the exemplary embodiment, the MS may then compare that received signal strength to a warning-level, in order to determine whether the received signal strength falls below the warning level. If it does, then the MS may conclude that a dropped call is about to occur.

For purposes of comparing a received signal strength with a warning-level, the warning-level will preferably be a signal strength that is sufficiently above the level at which a call-drop would be expected to occur (the call-drop level), so as to allow for a sufficient advanced warning to the user.

In this regard, the warning-level could be set at a fixed level for some or all mobile stations. Alternatively, the warning-level could be determined adaptively for some or all mobile stations, based on any of a variety of factors. Still alternatively, the call-drop level could be set statically or adaptively, and the warning-level could then be established as a relative offset from the call-drop level. The particular details of how to establish the warning-level are not necessarily critical.

Further, any of a variety of entities can function to establish the warning-level. For instance, the BSC can establish the warning-level that it will use as a threshold for BTS received signal strength. Similarly, the BSC can establish the warning level to be used as a threshold for MS received signal strength. In turn, if the MS is the entity that will compare MS received signal strength to the warning level, the BSC could report the warning-level to the MS. For instance, the BSC could send an indication of the warning-level to the MS in a user-definable field over an air interface paging channel. Or the BSC could publish the warning-level to a data store accessible by the MS, and the MS can then reference the warning-level in that data store. Alternatively, the MS itself could establish the warning level to be used as a threshold for MS received signal strength.

As a particular example, the BSC could regularly determine an average call-drop level for some or all of the mobile stations that it serves and can then set the warning level for those mobile stations to be a predefined extent above that average call-drop level. To do this, the BSC may maintain in its data storage 62 a running average of the received signal strength for dropped call events among the mobile stations that it serves. Each time a mobile station experiences a dropped call, the BSC can update the average based on the last known received signal strength for that mobile station. And the BSC may then set the warning-level to a sufficient extent above that average received signal strength.

This or other such determinations could be made per mobile station (or per type of mobile station.) In this regard, a data file that is maintained by and/or accessible to the BSC and/or MS can correlate call-drop level and/or warning-level with MS identity. For instance, a table can correlate each mobile station's Electronic Serial Number (ESN) with a particular warning-level. Or a table could indicate each mobile station's type (e.g., model name or number), and another table could indicate the warning-level and/or call-drop level per mobile station type. Further, note that the warning-level and/or call-drop level can vary depending on performance of the BSC or BTS and/or depending on other factors.

As noted above, the warning-level will preferably be set to exceed the call-drop level by an extent that allows for a sufficiently-advanced warning of a call-drop. That is, the time that passes between the moment the signal strength hits the warning-level and the moment the signal strength hits the call-drop level (or the moment when call-drop actually occurs) is preferably sufficient.

In this regard, the warning-level can be offset from the call-drop level by a fixed extent that is believed to be enough to allow for advanced warning. For instance, the warning-level can be set at a level such as 1 dB or 2 dB above the call-drop level.

Alternatively, the warning-level can be dynamically set per mobile station based on experience with past call drop events involving the mobile station and/or involving a population of mobile stations. More particularly, the warning-level can be dynamically set based on how much time has passed between the moment the received signal-strength hit the warning-level and the moment the received signal strength hit the call-drop level (or the moment of call-drop) for past call drop events involving the mobile station or involving mobile stations of a given population.

For instance, the BSC can maintain a record of warning-level per MS. And the BSC can be programmed to adjust the warning-level in an effort to approximate or approach a 30 second call-drop warning. To do so, each time the MS experiences a call-drop event, the BSC can determine how much time passed between the warning-level and the call-drop level. If that time is less 30 seconds, then the BSC may increase the warning-level so as to increase the warning time. And if the time is greater than 30 seconds, then the BSC may decrease the warning level so as to decrease the warning time. (Similarly, an MS may set its own warning level by a similar process.)

Alternatively, the BSC may determine the average time that has passed between warning-level and call-drop level for a past number of call-drop events. And, based on that average, the BSC may then adjust the warning-level in an effort to approach a desired duration between warning-level and call-drop level for subsequent call-drop events. Variations on this process are also possible.

The fact that received signal strength has fallen below a warning-level can indicate that a call drop is about to occur. On the other hand, it is also possible that a drop in received signal strength may be merely an aberration, and the signal strength might quickly rise again. Therefore, it is possible that a drop below the warning-level might not itself accurately reflect that a call drop is about to occur.

According to the exemplary embodiment, the foregoing process can be improved by considering a change in received signal strength over time, such as by comparing received signal strength to multiple threshold levels.

For instance, if the received signal strength drops substantially continuously from a first warning-level down to a second warning-level, then it may be reasonable to conclude that the MS is on course to experience a dropped call. On the other hand, if the decrease in received signal strength from the first warning-level to the second warning-level is not substantially continuous, then it may be more likely that the drop below the second warning-level was just an aberration.

The determination of whether the decrease from the first warning-level to the second warning level is "substantially continuous" can be a matter of judgement. For example, the decrease can be said to be substantially continuous only if the change in signal strength from the first level to the second level is always negative. And as another example, the decrease can be said to be substantially continuous as long as the signal strength does not increase by more than a threshold amount during its descent from the first level to the second level. Other examples are also possible.

b. Prediction by Comparison of MS Location

As another example, the function of predicting that a call is about to be dropped can take into consideration the location of the MS, with respect to one or more known problem areas in the network. For instance, if a geographical area is known to have a high incidence of dropped calls, then it may be reasonable to conclude that an MS approaching, entering or operating in that area is about to experience a dropped call.

Figure 6:
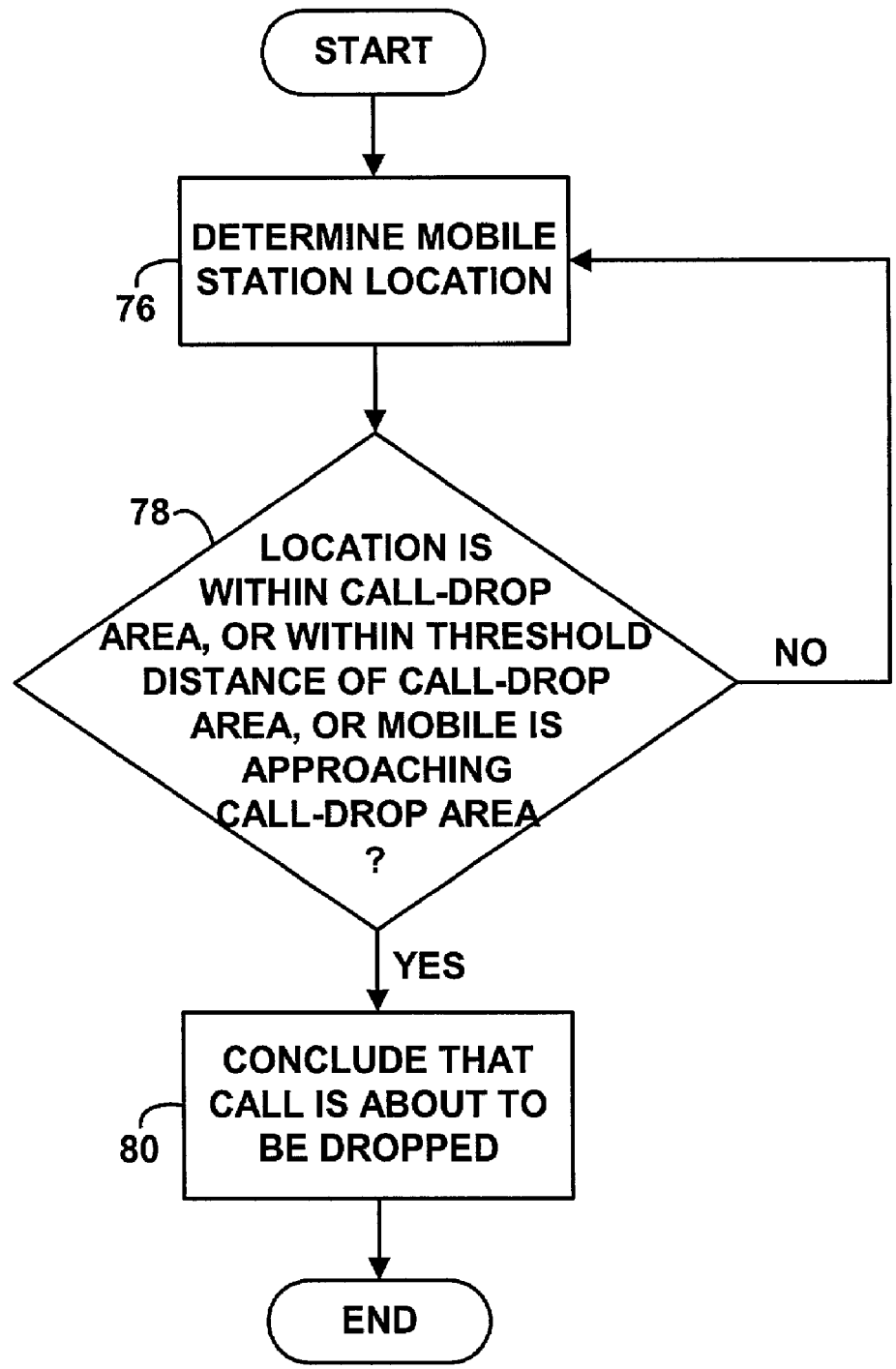
FIG. 6 is a flow chart depicting consideration of mobile station location to determine that a call is about to be dropped, in accordance with an exemplary proactive call drop management system.

This process is generally illustrated by a flow chart in FIG. 6, for a mobile station that is engaged in a call. As shown in FIG. 6, at block 76, the location of the mobile station is regularly determined. At block 78, a determination is then made as to whether the mobile station's location falls within a designated call-drop area, or within a threshold distance of a call-drop area, or whether the mobile station is approaching the call-drop area. If so, then at block 80, a conclusion is made that the call is about to be dropped.

In this regard, a database system can keep a list of "call-drop areas" that have exhibited a high incidence of dropped calls. (Each area can be defined in any desired manner. For instance, an area can be defined as a particular cell or sector. Alternatively, an area can be defined as a polygon having as nodes particular geographic coordinates. Further, an area can be contiguous or non-contiguous.)

In the exemplary embodiment, the database system can be maintained by the BSC, by the MS and/or by another entity such as a database server accessible to the BSC and/or MS. Referring to FIG. 1, for instance, the database system may take the form of database server 102, which, as noted above, may be communicatively linked with BSC 18, with MSC 20, with mobile positioning center (MPC) 100 and with IP network 26.

To keep a list of call-drop areas, the database system may correlate dropped-call data with MS-location data and may keep a record of where dropped calls have been occurring over a past timeframe (such as over the past 5 hours or 24 hours). In the arrangement of FIG. 1, for instance, database server 102 could regularly receive from MSC 20 call detail records (CDRs) that reflect the outcome of calls, such as when calls are dropped, and that identify the mobile stations involved with those calls. And database server 102 may receive from MPC 100 location information, indicating where particular mobile stations are located. Database server 102 may then programmatically correlate those records, so as to establish where dropped calls have been occurring. (In a particular implementation, the database server could be programmed to query MPC for the location of a given mobile station each time the database server receives a CDR that reflects a call drop involving that given mobile station.)

With that information, the database system may then programmatically establish a count, per area of the number of dropped calls that have occurred. For instance, each time an MS experiences a dropped call, a determination can be made that the MS is located in a given location that is encompassed by a given area. The database system's count of dropped calls for that area can then be incremented by one. And the database system can then identify a given area as a call drop area if the number of dropped calls that occurred in that area over the past timeframe exceeds a predefined threshold.

Alternatively, the database system could dynamically define call drop areas by establishing boundaries that surround areas where more than a threshold number, rate or density of dropped calls have occurred. More particularly, the database system could plot locations of call drop events and can perform a density analysis to identify dense regions of call drops. For each dense region, the database system could then define a call-drop region as an area of a given radius around the center of the region. Other methods of establishing a list of call-drop areas may be possible as well.

In the exemplary embodiment, the database system can include a summary or rollup table that effectively lists all of the areas having a dropped-call count of more than a defined threshold level and that therefore constitute call-drop areas. Thus, another entity could query the database server to determine whether a given location falls within a call-drop area.

As noted above, under industry standards, it is or will be possible to determine the location of an MS, often with great granularity. Under these standards, an MS may include GPS functionality so as to determine its own location. And the MS may then report that location to a network entity. Alternatively, a network entity could use other means, such as triangularization, to determine the location of an MS.

Applying these industry standards, an MS, BSC and/or other entity can regularly monitor the location of an MS. And the entity can regularly consult the database system to determine whether that location falls within one of the call-drop areas. If the location falls within one of the call-drop areas, then the entity may reasonably conclude that the MS is about to experience a dropped call.

The mechanism for determining whether the MS is located within a call-drop area can take various forms. For example, referring to FIG. 1, if MS 12 includes GPS functionality, MS 12 can be made to regularly report its location to BSC 18. (For instance, BSC 18 may regularly send a signal to MS 12, pursuant to the industry standard published as EIA/TIA IS-801, requesting the location of MS 12, and MS 12 can respond accordingly.) Each time the BSC receives a location report from the MS, the BSC can then query database server 102, to determine whether the location falls within a call-drop area.

As another example, the BSC can regularly determine the location of MS 12 in another manner, such as by regularly querying the MPC 100. In this regard, the BSC could send a signaling message through MSC 20 to the MPC, requesting the location of MS 12. Or the BSC could be coupled to the MPC through a more direct link, such as an IP link for instance, and the BSC could query the MPC through that link, using any suitable signaling protocol. In turn, the BSC could then query the database server 102 to determine whether the location falls within a call-drop area.

As another example, if MS 12 has access to database server 102 (such as through a 3 G data link for instance), the MS can determine its own location and then query the database serer itself to determine whether the location falls within a call-drop area.

As yet another example, the database server 102 itself could regularly monitor the location of MS 12 (such as by regularly querying the MPC 100) and could compare the location to its record of call-drop areas to determine whether the location falls within a call-drop area. And as still another example, the MPC 100 could regularly monitor the location of the MS and could then query the database server to determine whether the location falls within a call-drop area. Other mechanisms for determining if the MS is located within a call-drop area may be possible as well.

A determination that MS 12 is located within a defined call-drop area can trigger a call-drop warning. In the exemplary embodiment, however, the process can be improved by considering whether an MS is close enough to the call-drop area or is on a trajectory heading toward the call-drop area, rather than merely whether the MS is already within the call-drop area.

This process can be similar to the threshold process described above with respect to received signal strength. MS location can be compared to a warning-area (akin to a warning-level) that encompasses the call-drop area (akin to the call-drop level). When the MS enters the warning area, a conclusion can reasonably be drawn that the MS is about to experience a dropped call.

Alternatively, MS location can be compared to two or more warning-area boundaries that encompass the call-drop area. A first warning area can encompass and be larger than a second warning area. And the second warning area can encompass and be larger than the call-drop area. (Alternatively, note that the call-drop area could itself be the second warning area, and so a determination can be made that the MS has moved from a boundary of a first warning area to the boundary of the call-drop area.) Thus, if the MS moves into the first warning area and then moves substantially continuously enough to the boundary of the second warning area, a conclusion can reasonably be drawn that the MS is about to experience a dropped call.

In the exemplary embodiment, database server 102 could be programmed to establish (or identify) not only call-drop areas, but also warning-areas. For example, if the database server defines a call drop area as extending out by a particular radius from the center of a dense region of call drop events, the database server could define a corresponding warning-area as extending out by a longer radius from the center of the region. The warning-area radius could be set to exceed the call-drop area radius by a fixed distance.

And as another example, the database server could define multiple warning-areas, such as a first warning-area extending out by a first radius from the center of the region, and a second warning-area extending out by a second radius from the center of the region. The first radius could be longer than the second radius, and both the first and second radii could be longer than the call-drop area radius.

The database server may then maintain one or more rollup tables that effectively list all of the warning-areas. Thus, another entity such as the BSC, MS or MPC could query the database server to determine whether a given location falls within a warning-area. Or the database server itself could refer to its stored data so as to determine whether a given location falls within a warning area.

In the exemplary embodiment, if an entity determines that MS 12 is moving substantially continuously toward the call-drop area, the entity could consider the speed with which the MS is moving. For instance, if the entity determines that the MS moves from the first warning-area boundary to the second warning-area boundary within a predefined period of time, then the entity could conclude that the MS is about to experience a dropped call. Further, as the MS moves more quickly from the first warning-area boundary into the second warning-area boundary, the entity may conclude that it is more likely that the MS is about to experience a dropped call.

Note additionally that the entity making this determination could also, or instead, consider whether the MS moves substantially continuously from a warning area boundary to the call-drop area boundary. And again, the entity could consider the speed of movement of the MS from one boundary to the next. Additional variations on this process may be possible as well.

2. Warning of an Imminent Call-Drop

In accordance with the exemplary embodiment, when a determination is made that an MS is about to experience a dropped call, a warning can be provided to one or more of the call participants. The warning, and the process of providing the warning, can take any of a variety of forms.

By way of example, if the BSC determines that an MS is about to experience a dropped call, the BSC could send a predefined control signal to the MS, and the MS can respond by presenting an alert to a user of the MS. The predefined control signal, for instance, can be a predefined code conveyed in a user-definable message over the paging-channel (such as an IS-2000 "Feature Notification Message," which includes an 8-bit "Record Type" parameter, an 8-bit "Record Length" parameter, and a variable length parameter for carrying type-specific information). The MS may then receive the predefined code and responsively present an alert to the user. Similarly, if the MS itself determines that it is about to experience a dropped call, the MS can responsively present an alert to the user.

The alert that the MS presents will preferably be sufficient to draw the user's attention. As such, the form of the alert might depend on the manner in which the user is interacting with the MS. For instance, if the user is engaged in a voice call, the alert might be a tone or background voice announcement played out to the user. Such an alert might be played to the user without the other call participant(s) hearing the alert.

Alternatively, if the user is engaged in a data session through interaction with a display screen on the MS, the alert might be a visual alert, such as a pop-up message on the display screen. Still alternatively, the alert could involve flashing lights on a keypad of the MS. And yet alternatively, assuming the MS is a handheld device, the alert could take the form of a vibration of the MS.

As another example, the alert could be sent to the user of the MS by injecting the alert into a voice or data stream that is being sent to the MS. For instance, if the BSC determines that the MS is about to experience a dropped call, the BSC could bridge a warning signal (e.g., a voice announcement, or a tone) into a voice stream that the BSC is sending to the MS, or the BSC could instruct another entity to do so.

Additionally or alternatively, the alert could be sent to the user of the MS through a channel other than the MS. For instance, if the user also has a pager, the alert could be sent to the user's pager.

According to the exemplary embodiment, a warning of an imminent call-drop could also, or instead, be provided to another participant in the call. One way to do this is to inject the warning bi-directionally into the call, so that both the user of the MS and the other participant(s) hear or see the warning. And another way to do this is to send a message separately to the other participant(s), through any suitable communication channel.

Further according to the exemplary embodiment, a sequence of warnings can be provided as the likelihood of a dropped call increases. For instance, upon passing a first warning-level or a first warning-area boundary, a first warning can be provided to a call participant. And upon passing a second warning-level or a second warning-area boundary, a second warning can be provided to a call participant. Each subsequent warning can be stronger (e.g., louder, brighter, more intrusive, etc.), so as to increasingly draw the participant's attention to the impending call-drop. Note that increasingly strong warnings can similarly be provided when the likelihood of a call-drop is established based on signal strength or based on speed of movement toward a call-drop area, as noted above.

In the exemplary embodiment, the BSC and/or MS (or other entity) will maintain or have access to stored profile information that indicates whether and how to issue a warning upon determination that an MS is about to experience a call-drop.

For example, the BSC may include or have access to a profile store that specifies call-drop warning preferences for each of many users. Such a database might specify for a given user that the BSC should send a particular control signal to the user's mobile station so as to cause the mobile station to present a particular call-drop warning. Or the database might specify for a given user that the BSC should inject a voice or data announcement into a stream being sent to the user's mobile station. Or, as another example, the database may specify for a given user that the BSC should send a call-drop warning to the user's pager or to some other device, system or account associated with the user. When the BSC determines that an MS is about to experience a call drop, the BSC may refer to the profile store to find out whether and how to provide a warning.

Similarly, a given MS may include a stored indication of whether and how to alert a user of an imminent call drop. Such an indication may indicate that the MS should provide a vibrate alert, or an audible alert, or some other sort of alert. Or the indication may take other forms as well.

In the exemplary embodiment, a provisioning system can also be provided, through which an administrator or user may be able to set up preferences for call-drop warnings, so as to establish the stored profile information indicating whether and how to warn of an imminent call drop. The provisioning system could reside on the MS, at a web site, at an operator center, or elsewhere, and it could take any of a variety of forms.

D. Reactive Management of Dropped Calls

Figure 7:
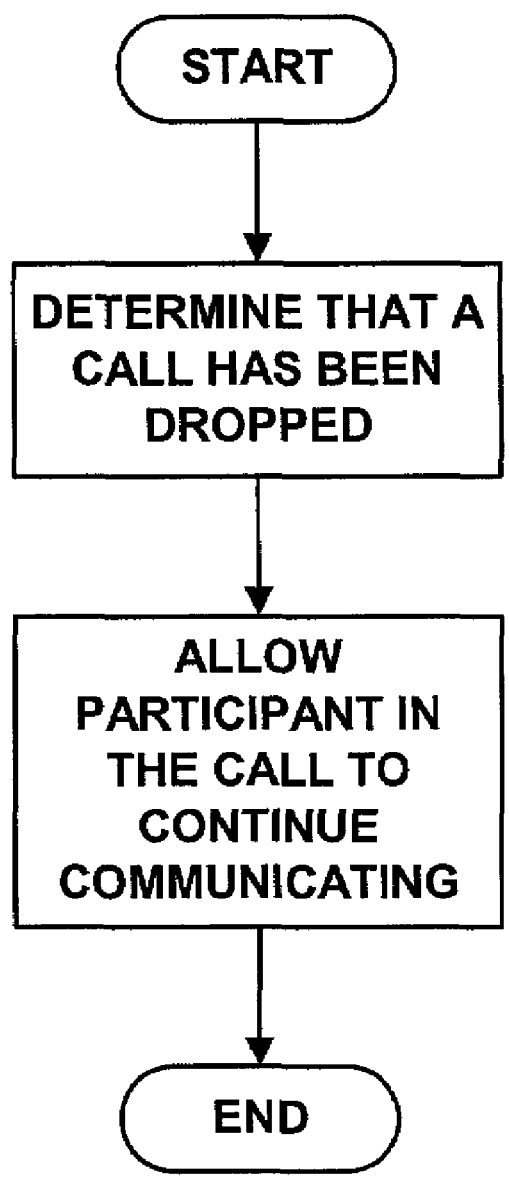
FIG. 7 is a flow chart depicting functions employed in an exemplary reactive call drop management system.

Pursuant to another aspect of the exemplary embodiment, a determination may be made that a call has been dropped, and a participant in the call can be allowed to continue communicating. This reactive mechanism is generally illustrated by a flow chart in FIG. 7.

In the exemplary embodiment, these functions will be carried out at least in part by the MS that experienced the dropped call, since it is in the best position to know that the dropped call occurred and to continue interacting with a call participant.

1. Determining that a Call has been Dropped

During a normal call with an MS, data regularly flows between the MS and the BSC. Even when the MS is not sending or receiving data, a keepalive control signal will typically flow in the air interface traffic channel assigned to the MS. When a user of an MS ends a call, such as by pressing an END key for instance, the MS will then send an end-of-call control signal to the BSC indicating that the call has ended. Similarly, when the other participant(s) end the call, the BSC will usually send an end-of-call control signal to the MS indicating that the call has ended. In either instance, the BSC and MS will each responsively release the traffic channel that had been assigned to the MS, so that data will stop flowing over that traffic channel.

When a call drop occurs, the user will not have pressed the END key, and neither the MS nor the BSC will have received an end-of-call signal from the other. However, data will stop flowing over the traffic channel. Consequently, when data stops flowing over the traffic channel, and when the MS has not sent or received an end-of-call signal, the MS may conclude that the call has been dropped.

2. Allowing a User to Continue Communicating After a Call-Drop

In accordance with the exemplary embodiment, an MS can include functionality to allow a user to continue communicating after the call has been dropped. Generally speaking, the continued communication may be or include (i) communication between the user and the MS and/or (ii) communication between the user and another call participant, via the MS. The functionality to allow this continued communication can take any of a variety of forms.

As an example, in response to a call-drop event, the MS may automatically record the user's speech. In this regard, an MS that engages in digital communication over the air interface will already include a digitizer and encoder (e.g., a CDMA/EVRC codec) for establishing a data stream (e.g., CDMA/EVRC data) that represents the user's speech. To record the user's speech, the MS may then simply store that data stream in a suitable data store, such as flash memory for instance. Alternatively, the MS may record the user's speech in any other manner.

Because there might be some delay between the time a call-drop occurs and the time the MS detects the call-drop, the MS may be programmed to regularly buffer the last several seconds (e.g., 5 seconds) of the user's speech. That way, once the MS detects a call-drop, the MS may append the buffered speech together with continued speech by the user, so as to help provide speech continuity from the moment the call drop occurred.

The MS may record the user's speech for a preset period of time. The time period may depend on storage capacity in the MS and on other factors. By way of example, the MS may store 30 seconds of user speech.

Alternatively, rather than automatically recording the user's speech when a call-drop occurs, the MS may do so in response to user instruction, or in response to some other triggering event that occurs as a result of the call-drop event. For instance, when the MS detects a call-drop, the MS may the prompt the user to indicate whether the user wants the MS to record the user's speech. (The MS may do so through a display-screen interface, or through an audible interface, or in any other manner desired.) If the user then instructs the MS to do so, then the MS may then record the user's speech.

Figure 8:
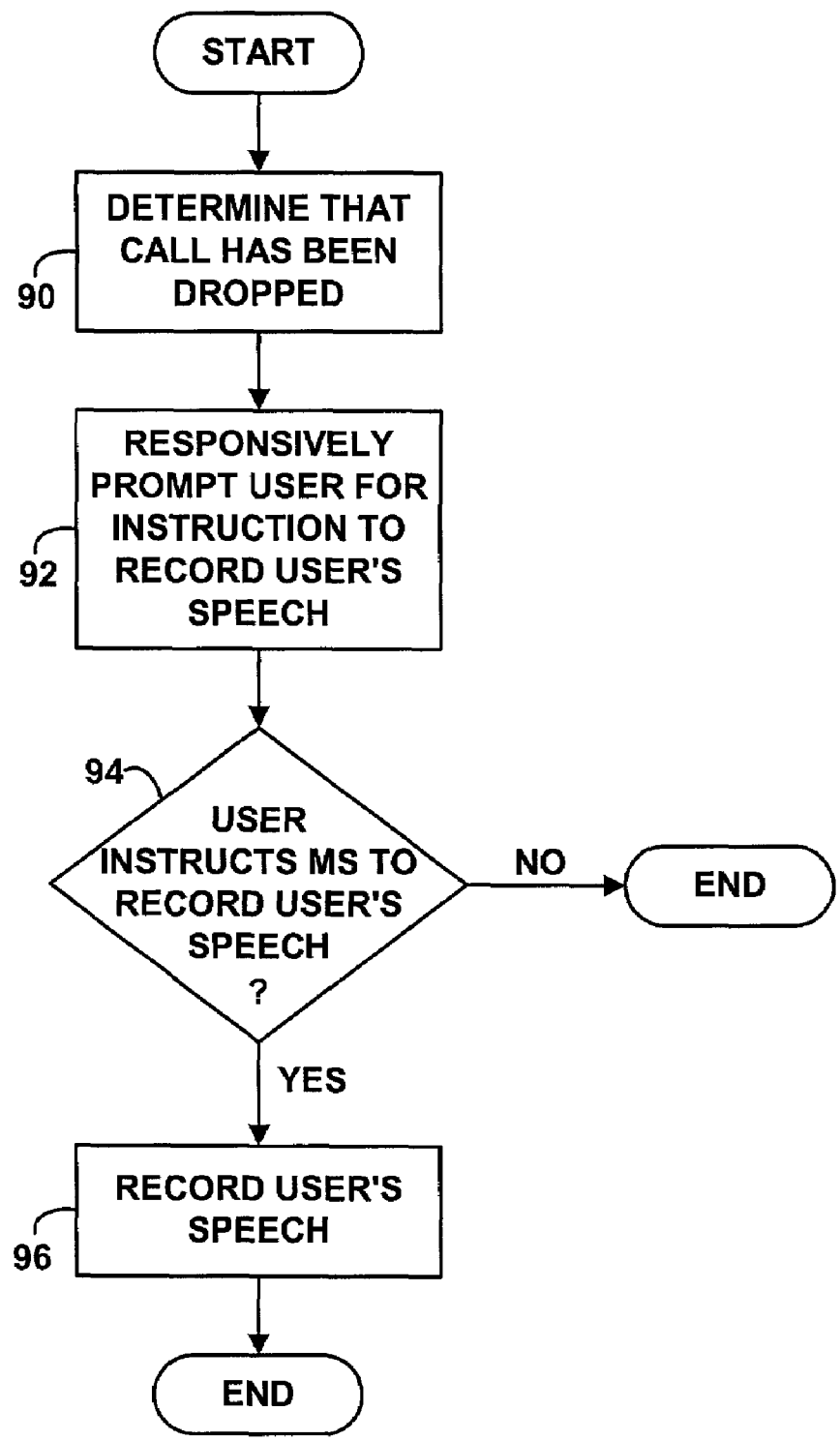
FIG. 8 is a flow chart depicting functions employed in an exemplary reactive call drop management system, including prompting for user instruction to record the user's speech.

This procedure is illustrated by a flow chart in FIG. 8. As shown in FIG. 8, at block 90, the MS determines that a call drop has occurred. In response, at block 92, the MS presents a prompt to the user, asking the user whether to record the user's speech. At block 94, the MS then determines what response the user provides to the prompt. If the user does not instruct the MS to record the user's speech, then the process ends. Whereas, if the user instructs the MS to record the user's speech, then, at block 96, the MS records the user's speech.

An exemplary MS will include logic to allow a user to selectively listen to the recorded speech signal. For instance, the MS may include a user-interface with which the user can interact so as to instruct the MS to play out the recorded speech signal or to allow the user to re-record the speech signal. (Advantageously, this will allow the user to speak what is on the user's mind and to later access the recorded speech—as with a personal dictation machine.)

In accordance with the exemplary embodiment, the MS may also be arranged to send the recorded speech signal off to another call participant. The MS may do this automatically and/or in response to user instruction (such as through the user-interface noted above). And the MS may do so in a variety of ways.

Figure 9:
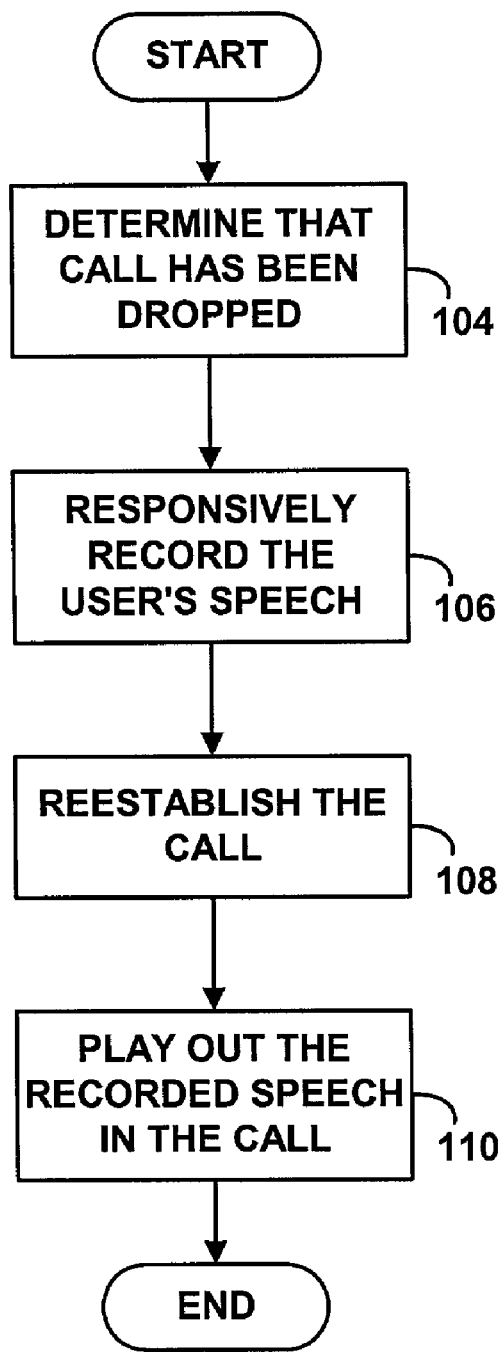
FIG. 9 is a flow chart depicting functions employed in an exemplary reactive call drop management system, including reestablishing a call and playing out a recorded speech signal.

For example, the MS may reestablish a connection (e.g., a new call) with the other participant and then send the recorded speech signal through that connection to the other participant. This process is illustrated in FIG. 9. As shown in FIG. 9, at block 104, the MS determines that a call has been dropped. And at block 106, the MS responsively records the user's speech (e.g., responsively prompting the user for instruction to record the user's speech, and then recording the user's speech). At block 108, the MS thereafter reestablishes the call. And at block 110, the MS plays out the recorded speech within the call.

In this regard, the MS will typically have a stored indication of the telephone number (or other network address) of the other participant, either because the user of the MS had initiated the call by dialing that number or because the MS received the number as caller-ID information upon termination of the call to the MS. According to the exemplary embodiment, once the MS detects a dropped call, the MS may begin automatically "redialing" the other participant, in an effort to reestablish the connection. (Alternatively, once the MS detects a dropped call, the MS may prompt the user for instruction to automatically redial and, upon receipt of user instruction to do so, may proceed accordingly.)

If the MS cannot establish a connection with the other participant, such as if the MS cannot acquire a traffic channel, or if the network or other participant is busy, the MS may automatically retry. The MS may do so periodically, such as every 10 seconds for instance. And the MS may retry a set number of times or continuously until the MS receives a user instruction to stop trying.

Note that another way for the MS to reestablish a connection with the other participant is for the other participant to call the MS and for the MS to answer the call (automatically or through user interaction). This may commonly occur after a call-drop, where the other participant, rather than the user of the MS, seeks to reestablish the connection. In this scenario, the MS can detect that the connection has been reestablished, because the calling number would be the same number with which the user had been communicating.

Once the MS reestablishes the connection with the other participant, the MS may then play out the recorded speech signal to the other party. The MS may do this automatically or with user instruction.

The MS may announce the speech signal to the other participant. For example, the MS may play to the other participant a prerecorded announcement indicating that the "following" was prerecorded at the user's station. Further, the MS may prompt the other participant for authorization to play out the recorded speech signal. For instance, the MS may play a prerecorded announcement to the other participant, asking the other participant if he or she wants to hear the user's speech signal. After receiving approval from the other participant, the MS may then play out the recorded speech signal.

Alternatively, the MS may begin playing the recorded speech signal automatically upon establishing the connection with the other participant. In doing so, the MS may pause momentarily before beginning to play out the speech signal, so as to leave time for the other participant to provide a greeting such as "Hello."

As another example, once the MS reestablishes the connection with the other participant, the MS may await user instruction before playing out the recorded speech signal. For instance, the user may speak normally with the other participant and might explain to the other participant that the user is about to play the recorded speech signal. The user might then interact with a user-interface such as that noted above, to instruct the MS to play out the recorded speech to the other participant.

The MS may send off the user's recorded speech signal to the other participant in other ways as well. For example, the MS might convert the user's recorded speech signal to a text representation of the user's speech and then send the text to the other participant.

In this regard, the MS could be programmed with a speech-to-text conversion engine of the type now known or a type later developed. Automatically, or in response to user instruction, the MS may then apply the engine to establish a text representation of the user's speech and could then send the text representation to the other participant.

The MS may send the text representation to the other participant in any of a variety of ways. For instance, if the MS is capable of sending Short Message Service (SMS) messages, the MS could send the text as one or more SMS messages to the other participant. Preferably, the other participant will be operating a station that is capable of receiving SMS messages and/or receiving e-mail messages that are derived from SMS messages, so that the other participant can receive the text message. Alternatively, the MS could send the text message as a pager message, as a wireless web message, or in any other form desired.

The MS may also take other actions to facilitate allowing a user to continue communicating after a call-drop event. For instance, even if the MS does not record the user's speech, the MS may still automatically work to reestablish a connection with the other participant. Or the MS may automatically prompt the user for instruction to reestablish the connection. And, as discussed above, in response to user instruction, the MS could then reestablish the connection. Other examples are possible as well.

E. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. In a wireless communications system in which a mobile station communicates with a base station via an RF air interface, a method carried out by the mobile station comprising:
   making a determination that a call in which the mobile station was engaged has been dropped, wherein making the determination comprises detecting that data has stopped flowing over the RF air interface from the base station to the mobile station, although the mobile station has not sent or received an end-of-call signal for the call; and
   responsive to the determination, automatically recording in the mobile station a post-call-drop speech signal provided by a user of the mobile station, wherein recording in the mobile station a post-call-drop speech signal provided by the user comprises receiving a speech signal provided by the user, encoding the speech signal as CDMA/EVRC data, and storing the CDMA/EVRC data in a data storage medium.

2. The method of claim 1, wherein recording in the mobile station a post-call-drop speech signal provided by the user comprises:
   recording the post-call-drop speech signal for a pre-set period of time.

3. The method of claim 2, wherein the preset period of time is 30 seconds.

4. The method of claim 1, wherein, in normal operation during a call, the mobile station buffers an ongoing speech signal provided by the user, the method further comprising:
   combining the ongoing speech signal with the post-call-drop speech signal.

5. The method of claim 1, further comprising: after recording the speech signal provided by the user, playing out the recorded speech signal to the user.

6. The method of claim 5, wherein playing out the recorded speech signal to the user comprises:
   playing out the recorded speech signal to the user in response to user instruction to play out the recorded speech signal.

7. The method of claim 1, wherein the user communicates with another entity during the call, the method further comprising:
   responsive to the determination that the call has been dropped, automatically reestablishing a call with the other entity.

8. The method of claim 1, wherein the user communicates with another call-participant during the call, the method further comprising:
   after making the determination that the call has been dropped, reestablishing a call with the other call-participant; and
   playing out the recorded speech signal in the reestablished call.

9. The method of claim 8, wherein playing out the recorded speech signal in the reestablished call comprises:
   playing out the recorded speech signal to only the user.

10. The method of claim 8, wherein playing out the recorded speech signal in the reestablished call comprises:
    playing out the recorded speech signal to the user and to the other call-participant.

11. The method of claim 8, further comprising:
    receiving instruction from the user to play out the recorded speech signal in the reestablished call, wherein the playing out of the recorded speech signal occurs in response to the instruction.

12. The method of claim 8, wherein the call was between the mobile station and another entity, and wherein reestablishing a call comprises:
    automatically originating a new call to the other entity.

13. The method of claim 8, wherein the call was between the mobile station and another entity, and wherein reestablishing a call comprises:
    receiving a new call from the other entity.

14. The method of claim 1, wherein automatically recording in the mobile station a post-call-drop speech signal provided by the user comprises:
    automatically prompting the user for instruction to record speech by the user;
    receiving instruction from the user to record speech by the user; and
    responsively recording speech by the user.

15. In a wireless communications system in which a mobile station communicates with a base station via an RF air interface, a method carried out by the mobile station comprising:
    detecting that the mobile station has experienced a call-drop, wherein detecting that the mobile has experienced a call-drop comprises detecting that data has stopped flowing over the RF air interface from the base station to the mobile station, although the mobile station has not sent or received an end-of-call signal for the call;
    responsive to the call-drop, prompting a user of the mobile station for instruction to record a speech signal provided by the user;
    receiving from the user an instruction to record a speech signal spoken by the user; and
    responsive to the instruction, recording a speech signal provided by the user.

16. The method of claim 15, wherein the user communicates with another call participant during the call, the method further comprising:
    after making the determination that the call has been dropped, reestablishing a call with the other call participant; and
    playing out the recorded speech signal in the reestablished call.

17. A mobile station comprising:
    a processor;
    data storage; and
    machine language instructions stored in the data storage and executable by the processor to cause the mobile station to perform a method comprising (i) detecting that a call in which the mobile station was actively engaged has been dropped and (ii) responsively recording into the mobile station a speech signal provided by a user of the mobile station, wherein the machine language instructions are executable to detect that the call has been dropped by detecting that data has stopped flowing over an RF air interface from a base station to the mobile station, and wherein recording into the mobile station a speech signal provided by the user comprises receiving a speech signal provided by the user, encoding the speech signal as CDMA/EVRC data, and storing the CDMA/EVRC data in the data storage.

18. The mobile station of claim 17, wherein the machine language instructions are further executable, in response to detecting that the call has been dropped, (i) to prompt the user for instruction to record the speech signal, (ii) to receive from the user an instruction to record the speech signal and (iii) to record the speech signal, in response to the instruction.

19. The mobile station of claim 17, wherein the user communicates with another call-participant during the call, and wherein the machine language instructions are further executable, in response to detecting that the call has been dropped, to reestablish a call with the other call-participant.

20. The mobile station of claim 19, wherein the machine language instructions are further executable to play out the recorded speech signal in the reestablished call.

21. The mobile station of claim 20, wherein the machine language instructions are further executable to play out the recorded speech signal in the reestablished call in response to instruction from the user to play out the recorded speech signal in the reestablished call.

* * * * *